Aug. 16, 1949.  E. O. ANDERSON  2,479,196
ANIMAL TRAP
Filed June 19, 1947  2 Sheets-Sheet 2
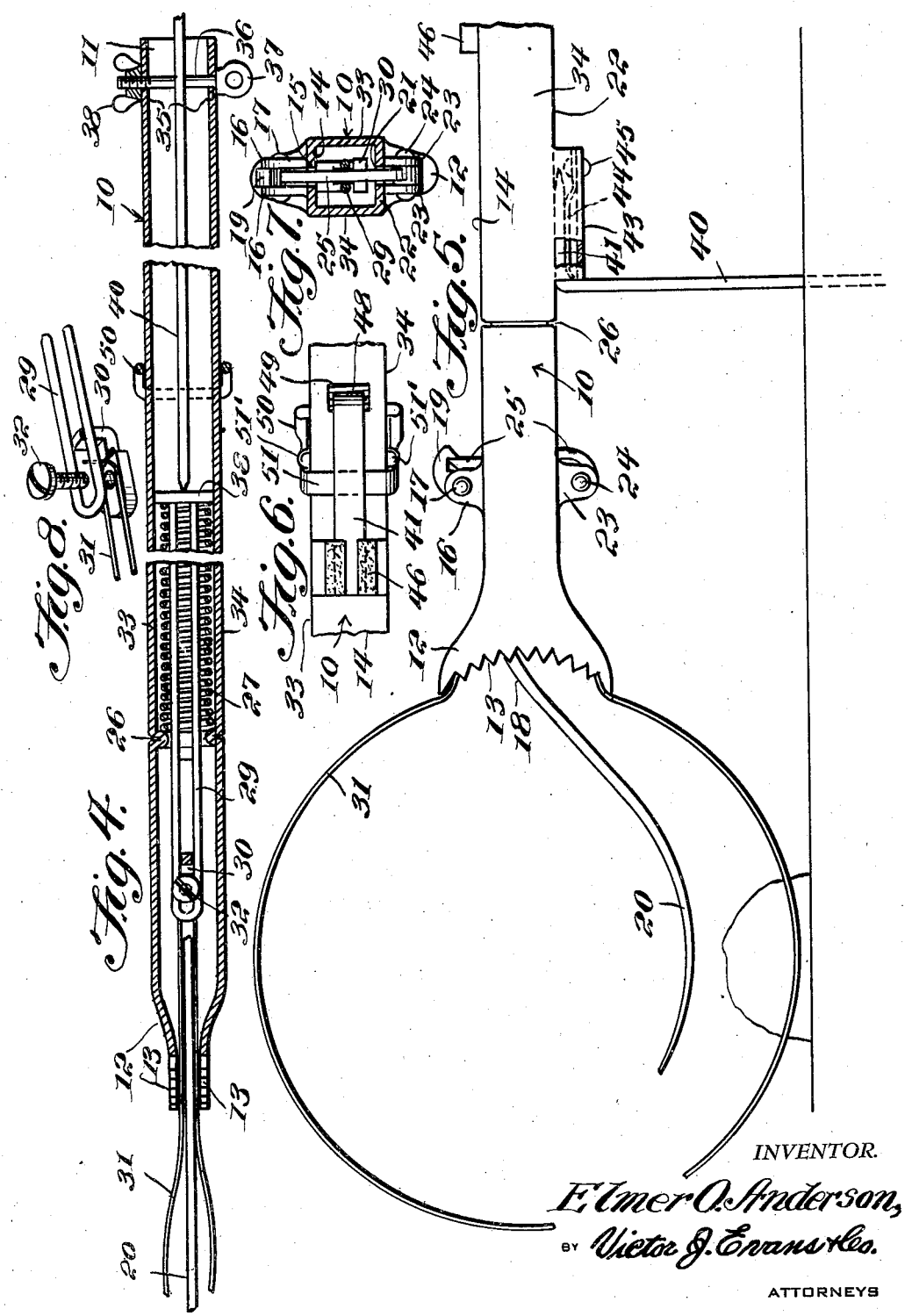
INVENTOR.
Elmer O. Anderson,
BY Victor J. Evans & Co.
ATTORNEYS Patented Aug. 16, 1949

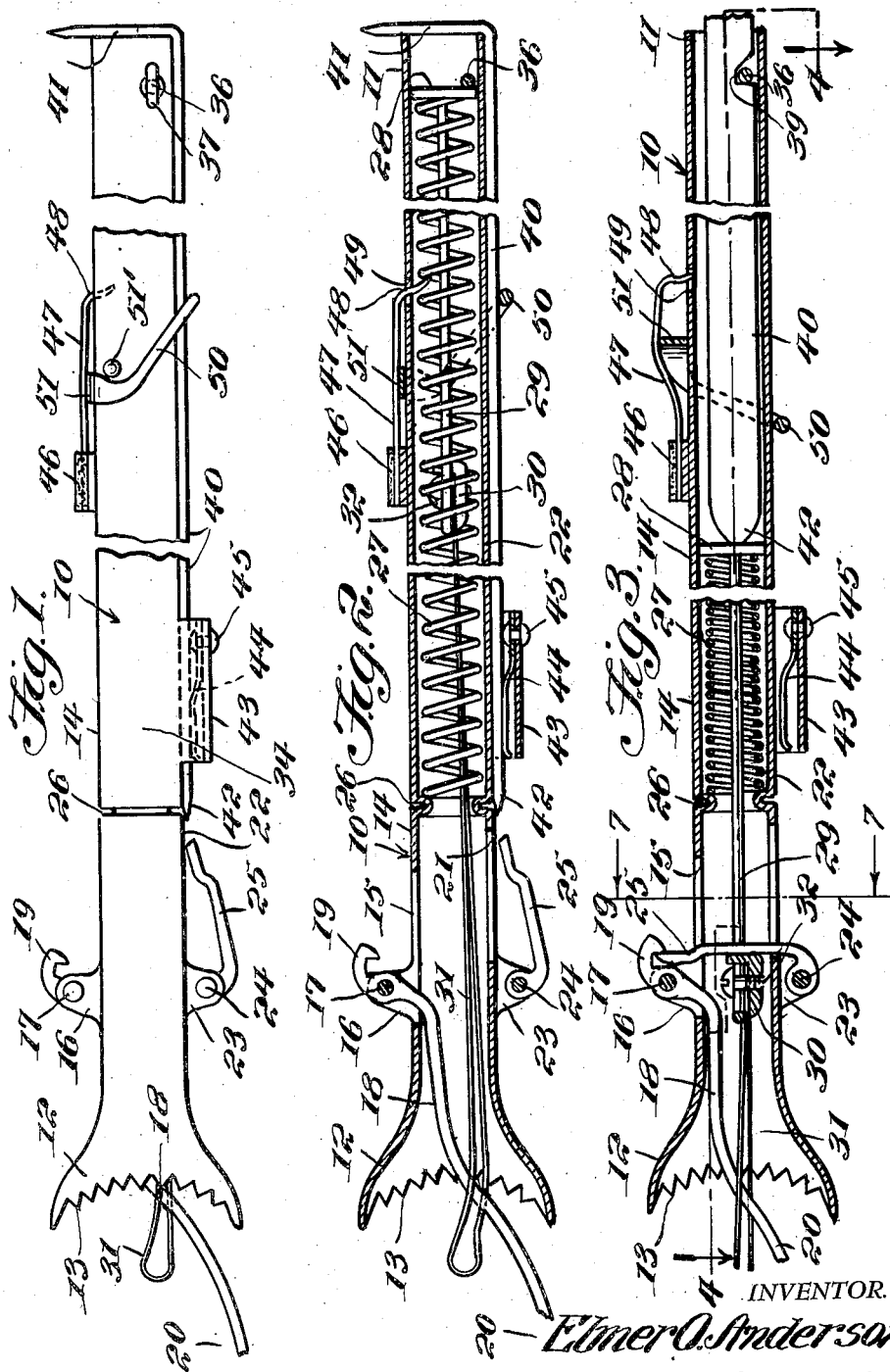

2,479,196

UNITED STATES PATENT OFFICE 2,479,196

ANIMAL TRAP

Elmer O. Anderson, Bremerton, Wash.

Application June 19, 1947, Serial No. 755,569

4 Claims. (Cl. 43—87)

This invention relates to animal traps and more particularly to a snare trap for fur bearing animals such as weasels, minks, skunks and others of the same size or smaller.

An object of the invention is to provide a trap that is made of light materials, resulting in a trap that is light in weight and compact, that will instantly kill the animal trapped and prevent it from escaping from the trap.

Another object of the invention is to provide a trap wherein all moving parts are concealed within a housing so that ice or snow will not prevent the trap from operating, and the trap can be completely hidden in the brush or dirt with only the trigger exposed without danger of the dirt or brush preventing operation of the trap.

With the above and other objects and advantages in view, the invention consists of the novel details of construction, arrangement and combination of parts more fully hereinafter described, claimed and illustrated in the accompanying drawings in which:

Figure 1 is an elevational side view of an embodiment of the invention;

Figure 2 is a longitudinal sectional view showing the trap sprung or before the setting thereof;

Figure 3 is a longitudinal sectional view showing the trap set and locked so that the snare may be adjusted;

Figure 4 is a sectional view on the line 4—4 of Figure 3;

Figure 5 is a side elevational view of the trap in position to trap an animal;

Figure 6 is an enlarged detailed view of the spring locking means;

Figure 7 is a sectional view on the line 7—7 of Figure 3;

Figure 8 is a perspective view of the attaching means for the loop and spring.

Referring more in detail to the drawings, the trap embodying the invention comprises an elongated rectangular shaped hollow housing 10, having an open rear end 11 and a vertically compressed and flared open forward end 12. The outer edges of the end 12 are concave in formation and provided with teeth 13 for the entire length thereof.

Just forwardly of the flared end 12, the housing is provided in its top wall 14 with an elongated longitudinally extending slot 15 and formed on the housing at the forward end of the slot 15 are the opposed upstanding apertured ears 16. A pin 17 mounted in the ears 16 transversely of the housing pivotally mounts the trigger 18 which comprises the hooked end 19 and the elongated curved animal engaging section 20, which extends forwardly of the end 12.

Approximately in line with the slot 15, an elongated longitudinally extending slot 21 is formed in the bottom wall 22 of the housing, and formed at the forward end of the slot 21, on the housing 10, are the depending opposed apertured ears 23. A pin 24 mounted in the ears, transversely of the housing, pivotally mounts the latch 25 which extends upwardly through the slots 15 and 21 in the housing 10 to be engaged at its upper free end by the hooked end 19 of the trigger 18, as shown in Figures 3 and 5.

Rearwardly of the slots 15 and 21, and spaced therefrom, to the fullest extended position of the latch 25, an inwardly crimped rib 26 is formed in all the walls of the housing, and this rib forms an abutment for the forward end of the compression coil spring 27 which is mounted in the housing 10 and extends longitudinally thereof.

Abutting the rear end of the spring 27 is a guide plate or plunger 28, which conforms to the contour of the housing 10, but is of a size to freely slide therein. Extending forwardly of the plate 28, within the spring 27, and fixed thereto, is a U-shaped wire plunger rod or snare attaching arm 29 which, at its forward curved end, is attached to the L-shaped coupling 30 fixed to the wire snare 31 by a set screw 32. The wire snare 31, in set position, as shown in Figure 5, extends forwardly of the end 12 beyond the full extending portion of the curved portion 20 of the trigger 18.

Extending transversely of the side walls 33 and 34 respectively of the housing 10, and mounted in the opposed openings 35 in the side walls, is a bolt 36 having a ring shaped head 37 and a wing nut 38 thereon. This bolt acts as a stop for the plate 28, and will also engage in the slot 39 of the combined setting and supporting rod 40.

This rod has one end 41 which is bent at right angles to the plane of the rod, and both the outer end of the end 41 and the rod proper are pointed as shown at 42. The rod is carried on the housing by means of the U-shaped keeper 43 formed on the bottom wall 22 just rearwardly of the rib 26, and a curved leaf spring 44 secured to the keeper 43 inwardly thereof by a fastener 45 will engage the rod 40 as shown in Figure 2, to retain the rod in carrying position on the housing. The end 41 assumes the position shown in Figures 1 and 2 when mounted as previously stated.

About halfway between the rib 26 and the rear end of the housing 10, there is formed on the top wall 14 of the housing, a boss 46 in which is fixed the rear end of the compression spring latch 47. The forward end 48 is slightly curved as shown in Figure 2, and extends into the housing 10 to engage the spring 27 by means of a slot 49 formed in the top wall 14 of the housing below the end 48. The end 48 is curved, as shown, to permit rearward movement of the spring, but prevent forward movement of the spring after the trap has been sprung.

To disengage the latch from the spring to permit the trap to be set, a releasing member 50 is mounted on the housing 10 beneath the spring latch and protuberances 51' formed on the side walls 33 and 34, forwardly of the member 50, retain the member on the housing, since the boss 46 will prevent movement of the member 50 beyond the boss 46.

The member 50 completely surrounds the housing 10, and is made of one piece of wire material which is flattened at 51 to give proper leverage thereto in fully releasing the latch 47, as shown in Figure 3.

In use, the trap is set by inserting the rod 40 into the housing 10, as shown in Figure 3, until it engages the plate 28. The member 50 is manipulated to raise the latch as shown in Figure 3, and the plate 28 is pushed forward compressing the spring 27. The latch 25 is then engaged behind the coupling 30 so that the free end thereof is received by the hooked end 19 of the trigger 18.

If the snare 31 does not need shaping, the rod 40 can then be removed from the housing, but if the snare needs shaping, the notch 39 in the rod 40 is engaged with the bolt 36 to hold the trap set during the shaping of the snare.

When the rod 40 is removed, the end 41 thereof may be inserted in the keeper 13, as shown in Figure 5, and the rod is inserted in the ground to retain the trap in trapping position, but used for a lure, is placed in back of the snare so that an animal must pass within the snare to get the bait, thus engaging the portion 20 of the trigger 18 to release the latch 25, and spring the trap. A chain may be connected to the ring shaped end of the bolt 36 to prevent the trap from being moved from its position beyond the limits of the chain attached thereto.

If it is desired to remove the snare wire, the bolt 36 is removed, the latch 47 is raised as shown in Figure 3, and the guide plate 28 and its component parts will be able to be moved outwardly of the housing 10 through the open rear end thereof. The screw 32 is removed from the coupling and a new snare is again secured to the rod 29 by the replacement of the screw 32. The plate and its component parts are then slid back into the housing 10, the bolt 36 is replaced, and the trap is again ready for operation.

When an animal has been caught in the snare and the trap has been sprung, the spring 27 will pull the snare taut about the animal. The teeth 13 will engage the animal to further retain the animal in the snare, and the latch end 48 will engage the spring to prevent the spring from moving forwardly in the housing, and loosening the snare, so that the more the animal struggles, the more the snare will tighten. The force of the spring will usually, however, quickly dispatch the animal, so that it cannot escape from the trap, and will not suffer long after being caught.

It is believed that from the foregoing description, the operation and construction of the trap will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A trap of the character described, comprising an elongated rectangular shaped housing, having an open rear end and a compressed flared open front end having teeth formed on the front edges thereof, a compression spring mounted in said housing longitudinally thereof, an abutment formed in said housing engaging the forward end of said spring, a plunger plate engaging the opposite end of said spring, a U-shaped arm secured to said plate and extending forwardly thereof within said spring, a wire snare, a coupling securing said snare to the front of said arm, a pivoted trigger on said housing, and a latch adapted to engage the coupling on the forward end of said arm and said trigger to retain said snare in trap setting position forwardly of the flared end of said housing.

2. The invention as in claim 1, wherein opposed apertured ears are formed on the top wall of said housing to pivotally mount said trigger and opposed apertured ears are formed on the bottom walls of said housing to pivotally mount said latch, and slots are provided in the top and bottom walls of said housing to permit free movement of said trigger and latch within said housing.

3. The invention as in claim 1, wherein said trigger is formed with a hooked end to engage said latch and a curved animal engaging section that extends forwardly of said flared end within the confines of said snare.

4. The invention as in claim 1, wherein a spring latch to prevent forward movement of said compression spring is mounted on the top wall of said housing and latch releasing means are mounted on said housing below said spring latch.

ELMER O. ANDERSON.

REFERENCES CITED

The following references are of record in the file of this patent:

UNITED STATES PATENTS

| Number | Name | Date |
|---|---|---|
| 1,342,425 | Crago | June 8, 1920 |
| 1,865,920 | Knippelmeir | July 5, 1932 |
| 2,168,132 | Marshall | Aug. 1, 1939 |